United States Patent [19]

Sterner

[11] Patent Number: 4,606,300

[45] Date of Patent: Aug. 19, 1986

[54] FISH FEED DISCHARGING APPARATUS

[76] Inventor: Mikael Sterner, Björkvägen 38, S-793 00 Leksand, Sweden

[21] Appl. No.: 732,700

[22] PCT Filed: Sep. 7, 1984

[86] PCT No.: PCT/SE84/00292

§ 371 Date: Apr. 25, 1985

§ 102(e) Date: Apr. 25, 1985

[87] PCT Pub. No.: WO85/01184

PCT Pub. Date: Mar. 28, 1985

[30] Foreign Application Priority Data

Sep. 9, 1983 [SE] Sweden .............................. 8304853

[51] Int. Cl.$^4$ ............................................. A01K 61/02
[52] U.S. Cl. ..................................... 119/51 R; 119/54
[58] Field of Search ................ 119/51 R, 54, 55, 56 A

[56] References Cited

U.S. PATENT DOCUMENTS 3,487,433 12/1969 Fleming ................................. 119/54
3,643,632 2/1972 Poirot .................................... 119/54
3,741,163 6/1973 Bush ...................................... 119/54

FOREIGN PATENT DOCUMENTS 660636 5/1979 U.S.S.R. ........................... 119/51 R

Primary Examiner—Robert P. Swiatek
Attorney, Agent, or Firm—Christel, Bean & Linihan

[57] ABSTRACT

An apparatus for discharging fish feed, including a feed portioning device (1-3) connected to a probe device (5), which is at least partially immersed in water and excitable by fish for activating the portioning device such as to discharge a quantity of feed to the fish. The probe device contains an element (8) sensitive to sound and/or pressure waves and which reacts for pushes against the probe device achieved by the fish, and accordingly sends signals to an electrical device (4) for activating the portioning device (1-3).

5 Claims, 1 Drawing Figure

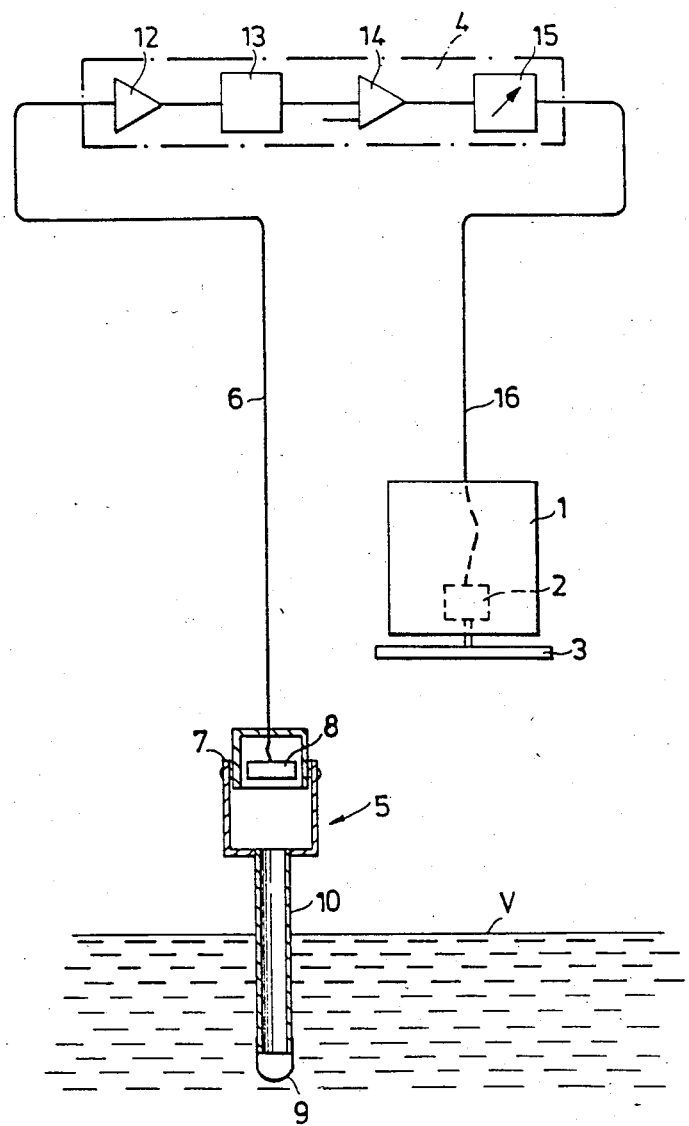

FISH FEED DISCHARGING APPARATUS

DESCRIPTION

TECHNICAL FIELD

The present invention relates to an apparatus for discharging fish feed, including a feed portioning device and a probe device connected thereto, at least partially immersed in water, and which is excitable by fish for activating the portioning device such as to discharge a quantity of feed to them.

BACKGROUND ART

Apparatus of the kind mentioned above are already known, e.g. from the U.S. Pat. Nos. 3,688,743, 3,730,142 and 4,270,489, the German published specification Nos. 2 310 382 and 2 441 936 and the Norwegian patent No. 128 514.

The apparatus according to the U.S. Pat. Nos. 3,688,743, 3,730,142 and 4,270,489 each include a pendulum dependent in the water. A body connected to the pendulum and mounted to cover an opening in a feed container uncovers a part of this opening when the pendulum is displaced by the fish from a straight-down dependent position, such that a given quantity of feed is discharged.

The greatest disadvantage with these apparatus is that a relatively large force is required to swing the pendulum, resulting in that the apparatus can only be used for relatively large fish. If the apparatus are used in conjunction with fish breeding in lakes, rivers or the like, currents and waves also cause the pendulum to be swung with undesired feed discharge as a result.

The apparatus according to the German published specification Nos. 2 310 382 and 2 441 936 include pendulums dependent in water in aquaria. When the pendulums are acted on by fish, a current circuit is closed so that a relay is excited to provide discharge of feed from a container suspended above the water surface.

Even if just as large a force is not required for swinging the pendulums according to both the last-mentioned publications, very small fish cannot achieve this pendulation. Furthermore, the pendulums would be affected by currents and waves, resulting in undesired feed discharge, if the apparatus were used for fish breeding outdoors. Since the contacts included in the current circuit are placed without protection and in the vicinity of the water they are oxidized rapidly, and the operational reliability of the apparatus is lowered. The apparatus according to the Norwegian patent No. 128514 includes a feed container with an opening through which feed is discharged with the aid of a conveyer screw coupled to an electric motor, which is started when a current circuit is closed by a sprung breaker arm being caused to engage a contact when bait attached to a line dependent from an arm is taken by a fish.

This latter apparatus also requires relatively large force, and furthermore the force must be applied in a given direction for the arm to close the circuit. This means that the apparatus cannot be used in breeding smaller fish. If the spring in the breaker arm is selected so that it is very weak, a minor force can indeed cause the circuit to be closed when a smaller fish takes the bait, but the apparatus will be very sensitive to currents, waves and winds at the same time, and can therefore be triggered even when there are no fish in the vicinity of the apparatus. The placing of the contact and breaker arm and their nearness to the water also results in operational problems.

DISCLOSURE OF INVENTION

One object of the present invention is to remove the disadvantages with previously known apparatus and provide a simple and operationally reliable apparatus which can be triggered by small fish as well, and which is insensitive to currents, waves and winds and similar environmental factors which can unintentionally trigger it.

This object is achieved by the invention having been given the characterizing features disclosed in the claims.

DESCRIPTION OF FIGURES

The sole FIGURE on the drawing schematically illustrates, partially in section, an apparatus in accordance with the invention.

PREFERRED EMBODIMENT

A fish feed portioning container 1 is suspended over a water surface V. The container 1 can, for example, be of the kind illustrated in the Swedish patent No. 73 14519-5 and contains a vibrator 2, which discharges the feed from the container via a plate 3 when the vibrator is supplied with electrical signals from an electrical central unit 4 connected to an unillustrated current source, the unit being connected to the container 1 via a cord 16 in which the tension has been unloaded.

A probe device generally denoted by the numeral 5 is partially immersed in the water directly under, or a short distant from, the container 1, The probe device 5 depends freely at one end of a tensionally unloaded cord 6. The other end of the cord is connected to the unit 4. The probe device includes a stiff casing 7, the upper portion of which forms the tensional unloading means. An element 8, sensitive to pressure, is molded fast at the middle of the upper part.

The lower portion of the casing 7 is screwed to its upper portion, and provided with a tube 10 at its lower end. The tube is terminated by a diaphragm 9, e.g. a plastic or rubber fingerstall which is sufficiently stiff so as not to be collapsed by the water pressure outside the housing.

The element 8 may be a microphone, a piezoelectrical, capacitive, inductive or other pressure-sensitive element.

The operation of the inventive apparatus will now be described together with the components included in the electrical unit 4.

When a fish pushes against the diaphragm 9, sound and/or pressure waves are formed in the tube 10 and housing 7, these waves being propagated, even if the push is very weak, to the sensitive element 8, which then gives a signal via conductors in the cord 6 to the unit 4. The signal is amplified in an amplifier 12 to a suitable level before it is taken to a lowpass filter 13 where high frequencies are filtered away. The signal is then taken to a comparator 14 with a level sensing circuit which, for a sufficiently strong signal, sends a control signal to a timer 15, the latter thus being activated, and, for a time interval set on the timer beforehand, sends a pulse to the vibrator 2 for discharging feed from the container 1 during this interval.

Although it has been found in trials that air is a good transmission medium from membrane 9 to the pressure-sensitive element 8, other media for this purpose can be envisaged.

The element 8 only takes up pressure and/or sound waves caused by momentary pushes against the diaphragm 9. If knocks against the casing 7 or the tube 10 are propagated as pressure and/or sound waves to the element 8, these are filtered away in the lowpass filter 13 since they have a frequency, due to the selectional material in the casing and tube, that differs from the frequency of the signals generated by pushes against the diaphragm, and thus lie outside the frequency range for the signals passed through by the filter. Pressure and/or sound waves generated by currents and waves in the water can indeed be transplanted to the element via the membrane 9 if they are sufficiently heavy and have a short-duration character, but they are not transplanted as signals to the portioning container 1, since these waves have a different frequency that is incorrect compared with the one generated for a direct rapid push against the diaphragm 9, and therefore no signals are passed from these waves.

It is possible to adjust the sensitivity of the inventive apparatus to the size of the fish which are bred, by providing the amplifier 12 with a potentiometer (not shown). If the bred fish are small and thus can only achieve weak pushes against the diaphragm 9, the potentiometer is set so that the signals from the element 8 are amplified to a suitable level before they are taken to the filter 13.

Even if only one embodiment of the invention has been described above and illustrated on the drawing, it should be understood that the invention is not limited to this embodiment but only by what is disclosed in the claims.

I claim:

1. Apparatus for discharging fish feed, including a fish feed portioning device (1-3) with a probe device (5) connected thereto and at least partially immersed in water, the device (5) being excitable by fish for activating the portioning device such as to discharge a quantity of feed to the fish, characterized in that the probe device (5) includes an element (8) sensitive to sound and/or pressure waves, said element reacting for pushes against the probe device achieved by the fish and accordingly sending signals to an electrical device (4) for activating the portioning device (1-3).

2. Apparatus as claimed in claim 1, characterized in that the electrical device (4) is arranged to activate the portioning device (1-3) only when the probe device (5) is subjected to momentary pushes.

3. Apparatus as claimed in claim, characterized in that the sensitive element (8) is enclosed in a waterproof casing (7) in the probe device (5).

4. Apparatus as claimed in claim 3, characterized by a tube (10) attached to the casing (7), the tube having a lower end provided with a diaphragm (9) the outside of which is actuable by the fish, and the inside of which forms a wall in a chamber inside the casing and tube in communication with the sensitive element (8).

5. Apparatus as claimed in claim 4, characterized in that the diaphragm (9) is flexible and consists of rubber or plastics.

* * * * *

UNITED STATES PATENT AND TRADEMARK OFFICE
CERTIFICATE OF CORRECTION

PATENT NO. : 4,606,300

DATED : August 19, 1986

INVENTOR(S) : Mikael Sterner

It is certified that error appears in the above—identified patent and that said Letters Patent are hereby corrected as shown below:

Claim 3, line 1, after "claim" insert --1--.

Signed and Sealed this

Fourth Day of November, 1986

[SEAL]

*Attest:*

DONALD J. QUIGG

*Attesting Officer*     *Commissioner of Patents and Trademarks*